United States Patent
Wodausch

(10) Patent No.: US 10,746,137 B2
(45) Date of Patent: Aug. 18, 2020

(54) TANK VENTING SYSTEM FOR AN INTERNAL COMBUSTION ENGINE AND METHOD FOR REGENERATING A SORPTION RESERVOIR

(71) Applicant: Volkswagen Aktiengesellschaft, Wolfsburg (DE)

(72) Inventor: Jens Wodausch, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 89 days.

(21) Appl. No.: 15/875,428

(22) Filed: Jan. 19, 2018

(65) Prior Publication Data
US 2018/0216578 A1 Aug. 2, 2018

(30) Foreign Application Priority Data

Jan. 31, 2017 (DE) .................. 10 2017 201 530

(51) Int. Cl.
*F02M 25/08* (2006.01)
*B60K 15/035* (2006.01)
*B60K 15/03* (2006.01)

(52) U.S. Cl.
CPC ..... *F02M 25/089* (2013.01); *B60K 15/03504* (2013.01); *B60K 15/03519* (2013.01);
(Continued)

(58) Field of Classification Search
CPC .......... F02M 25/0827; F02M 25/0854; F02M 25/0836; F02M 25/089; F02M 25/0809;
(Continued)

(56) References Cited

U.S. PATENT DOCUMENTS 5,988,151 A 11/1999 Schneider
6,092,515 A * 7/2000 Morikawa ........... F02D 41/0032
123/698
(Continued)

FOREIGN PATENT DOCUMENTS

CN 102192051 A 9/2011
CN 103270286 A 8/2013
(Continued)

OTHER PUBLICATIONS

Search Report including Provisional Assessment of Patentability issued by the German Patent and Trademark Office for German Patent Application No. DE 10 2017 201 530.6, dated Nov. 13, 2017.
(Continued)

*Primary Examiner* — Sizo B Vilakazi
(74) *Attorney, Agent, or Firm* — Manfred Beck, P.A.

(57) ABSTRACT

A tank venting system for an internal combustion engine includes a tank, which is connected via a tank vent to a sorption reservoir for a temporary storage of fuel from a tank venting flow. A purge air pump is provided for feeding regenerated fuel from the sorption reservoir via a purge air flow into an intake air flow to the internal combustion engine. A controller is configured to control the purge air pump in such a way that the purge air flow can be adjusted with regard to its pressure, its mass and/or its volume, thus ensuring that a metering of the regenerated fuel via the purge air flow into the intake air flow takes place in accordance with an operating state of the internal combustion engine. A method for regenerating a sorption reservoir is also provided.

18 Claims, 3 Drawing Sheets

(52) U.S. Cl.
CPC .... *F02M 25/0827* (2013.01); *F02M 25/0836* (2013.01); *F02M 25/0854* (2013.01); *B60K 2015/0319* (2013.01); *B60K 2015/0358* (2013.01); *B60K 2015/03514* (2013.01); *B60K 2015/03571* (2013.01); *B60K 2015/03585* (2013.01)

(58) Field of Classification Search
CPC .......... F02M 25/0872; F02M 25/0818; F02M 25/08; F02D 41/004; F02D 41/0032; F02D 41/003; B60K 15/03504; B60K 15/03519; B60K 2015/03514; B60K 2015/03585; B60K 2015/0319; B60K 2015/03571; B60K 2015/0358
USPC .................................. 123/518, 519, 520, 521
See application file for complete search history.

(56) References Cited

U.S. PATENT DOCUMENTS

| | | | |
|---|---|---|---|
| 6,138,644 | A | 10/2000 | Saruwatari et al. |
| 10,190,515 | B2* | 1/2019 | Casetti .................... F02D 9/02 |
| 2003/0000505 | A1 | 1/2003 | Auernhammer et al. |
| 2011/0076936 | A1 | 3/2011 | Gottschalk et al. |
| 2011/0132331 | A1 | 6/2011 | Pursifull |
| 2013/0319378 | A1 | 12/2013 | Haag et al. |
| 2016/0201613 | A1 | 7/2016 | Ulrey et al. |
| 2017/0152802 | A1* | 6/2017 | Casetti .................... F02D 9/02 |

FOREIGN PATENT DOCUMENTS

| | | |
|---|---|---|
| CN | 105781804 A | 7/2016 |
| DE | 197 01 353 C1 | 3/1998 |
| DE | 196 50 517 A1 | 6/1998 |
| DE | 19856842 A1 | 6/1999 |
| DE | 100 60 350 A1 | 6/2002 |
| DE | 103 23 869 A1 | 12/2004 |
| DE | 10 2009 011 155 A1 | 9/2010 |
| DE | 10 2010 064 239 A1 | 6/2012 |
| DE | 10 2013 109 459 A1 | 4/2014 |
| JP | 2014020268 A | 2/2014 |

OTHER PUBLICATIONS

Search Report issued by the European Patent Office for European Patent Application No. EP 3 354 508 A1, dated Jun. 14, 2018.
Search Report dated Oct. 8, 2019, issued by the State Intellectual Property Office of People's Republic of China for Chinese Patent Application No. 201810095282.6 which is related to U.S. Appl. No. 15/875,428.
Office Action dated Oct. 23, 2019 and machine translation thereof, issued by the State Intellectual Property Office of People's Republic of China for Chinese Patent Application No. 201810095282.6 which is related to U.S. Appl. No. 15/875,428.

* cited by examiner

TANK VENTING SYSTEM FOR AN INTERNAL COMBUSTION ENGINE AND METHOD FOR REGENERATING A SORPTION RESERVOIR

CROSS-REFERENCE TO RELATED APPLICATIONS

This application claims the priority, under 35 U.S.C. § 119, of German Patent Application No. DE 10 2017 201 530.6, filed Jan. 31, 2017; the prior application is herewith incorporated by reference in its entirety.

BACKGROUND OF THE INVENTION

Field of the Invention

The invention relates to a tank venting system of an internal combustion engine having a tank, which is connected via a tank vent to a sorption reservoir for temporary storage of fuel from a tank venting flow, and a purge air pump for feeding regenerated fuel from the sorption reservoir via a purge air flow into an intake air flow to the internal combustion engine. The invention furthermore relates to a method for regenerating a sorption reservoir, which is part of a tank venting system of this kind.

Tank venting systems or fuel evaporation retention systems are provided for vehicles that have a spark ignition engine as an internal combustion engine in order to prevent fuel vapors from being released from the tank (fuel tank).

In particular, such systems can help to lower hydrocarbon (HC) emissions. From a technical point of view, a number of requirements have to be met: on the one hand, it must be ensured that the internal pressure of a fuel tank does not increase to an impermissible extent—e.g. when subject to thermal radiation—and, on the other hand, it must be ensured that fuel vapors which are released are retained.

There must therefore be a possibility of venting the tank and a device for retaining the fuel vapors. For this function, a container containing activated carbon (activated carbon trap, activated carbon filter or ACF for short) is generally used, this container being connected to the gas/vapor phase of the fuel tank by a line and to the environment by another line or a connection.

During the venting of the tank, the ACF stores the fuel vapors, which accumulate on the activated carbon (adsorption reservoir), in the process filtering the venting flow from the tank, thus ensuring that no hydrocarbons enter the environment. Since ACFs have only a limited adsorption capacity, they must be regenerated at regular intervals. In this process, the fuel components accumulated on the activated carbon are released again. This is generally accomplished by purging the ACF with fresh air while traveling. For this purpose, the ACF is general y connected by a further line to the intake tract of the engine, via which fresh air is drawn in. The reduced pressure additionally draws fresh air through the ACF and this air is enriched with fuel—a process during which the activated carbon is regenerated—which is then burnt in the internal combustion engine.

In modern turbocharged engines, however, the intake pressure (vacuum) in the intake tract is often so low that adequate purging of the ACF during driving is not possible. The purge air flow produced is too low. Moreover, the purge air mass flow can fluctuate greatly with the changing pressure level in the intake tract. The pressure (vacuum) level bringing about the purge air flow is very heavily dependent on the respective driving situation or the operating state of the internal combustion engine, of a compressor and, in particular, of an exhaust turbocharger arrangement with which most modern spark ignition engines are provided.

In conventional tank venting systems, the purge air mass flow is adjusted with the aid of a "regenerating valve" (also referred to as a tank vent valve). This regenerating valve is disposed in a line which connects the activated carbon canister to the intake pipe. If the regenerating valve opens the line between the ACF and the intake pipe during travel or during the operation of the internal combustion engine, fresh air is drawn through the activated carbon. It picks up the fuel absorbed there and takes it for combustion. In the process, the activated carbon of the activated carbon canister is regenerated so that the activated carbon of the activated carbon filter is once again capable of absorbing freshly evaporating fuel from the fuel tank. This regeneration takes place at regular intervals.

Under some circumstances, it is necessary to modify the operating state of the internal combustion engine to ensure adequate regeneration of the activated carbon filter. In systems with direct gasoline injection in stratified charge operation, for example, in which the pressure difference between the intake pipe and the ambient pressure is very low, it is necessary to switch to homogeneous charge operation.

In conjunction with an engine controller, which can control the vent valve, and a $\lambda$ control device for adjusting the air/fuel mixture to be fed into the internal combustion engine, it is also possible to determine the degree of loading or saturation of the activated carbon filter. One such approach is known from German Patent No. DE 197 01 353 C1.

There are also systems in which a delivery device (e.g. a pump) for additional delivery (pressure increase) and for other tasks is provided between the activated carbon filter and the ventilation valve.

One approach, in which a pump of this kind is also provided for the purpose of carrying out a fuel tank leakage diagnosis, is known from German Patent Application Publication No. DE 10 2010 064 239 A1. Another system, in which a purge air pump is used in combination with an FSI (fuel stratified injection) engine, is known from German Patent Application Publication No. DE 196 50 517 A1. In this concept, however, no exhaust turbocharging is provided.

In the known systems, adjustment (open-loop or closed-loop control) of the purge air flow is accomplished by means of the purge air valve. As a result, there is a need for control valves, the flow through which is generally adjusted by means of a control duty factor. Here, a purge air pump provided by way of a supplementary measure operates at a fixed rated load—possibly also completely independently of the necessary pressure or volume flow requirements.

Particularly when feeding the purge air flow into the intake tract after the exhaust turbocharger in the flow direction, relatively high pressures are required for this purpose. There are also operating states in which the rated load of the pump is too low for maximum purging—the purging process takes longer than the operating state of the internal combustion engine would allow—or the pressure or volume flow is very high and is severely limited by the purge air valve—with the pump operating uneconomically.

SUMMARY OF THE INVENTION

It is accordingly an object of the invention to provide a tank venting system for an internal combustion engine and a method for regenerating a sorption reservoir which overcome at least some of the above-mentioned disadvantages of the heretofore-known systems and methods of this general type and which solve at least some of the problems explained above.

With the foregoing and other objects in view there is provided, in accordance with the invention, a tank venting system for an internal combustion engine, including:
a tank;
a tank vent;
a sorption reservoir;
the tank being connected via the tank vent to the sorption reservoir for temporarily storing fuel from a tank venting flow;
a purge air pump for feeding regenerated fuel from the sorption reservoir via a purge air flow into an intake air flow to the internal combustion engine; and
a controller configured to control the purge air pump such that the purge air flow is adjustable with regard to at least one parameter selected from the group including a pressure of the purge air flow, a mass of the purge air flow, and a volume of the purge air flow, so that a metering of the regenerated fuel via the purge air flow into the intake air flow occurs in accordance with an operating state of the internal combustion engine.

In other words, a tank venting system of an internal combustion engine in accordance with the invention includes a tank, which is connected via a tank vent to a sorption reservoir (activated carbon filter, ACF) for temporary storage of fuel from a tank venting flow, a purge air pump, which produces a purge air flow, by means of which regenerated fuel is carried out of the sorption reservoir into an intake air flow to the internal combustion engine, wherein a controller is provided, which is configured to control the purge air pump in such a way that the purge air flow can be adjusted in respect of its pressure, its mass and/or its volume, so that a metering of the regenerated fuel via the purge air flow into the intake air flow takes place in accordance with an operating state of the internal combustion engine.

In a system of this kind, the purge air pump is used not only to build up pressure or for volume delivery but also to adjust the purge air flow in respect of its pressure, its mass and/or its volume. This makes it possible to simplify the controllable vent valve that would otherwise be required and, respectively, the control thereof. It may even be possible to eliminate the valve entirely.

By virtue of the fact that the operation of the purge air pump is matched to an operating state of the internal combustion engine, a targeted metering of the regenerated fuel into the intake air flow or the intake tract via the purge air flow can be accomplished through the adjustment (closed-loop control and/or open-loop control) of the purge air pump. This is particularly important in the case of modern engines since otherwise the required narrow limits for exhaust emissions can be complied with only with difficulty. With a system of this kind, precise fuel metering, which is implemented not only by means of the directly injected fuel but also by means of the fuel additionally fed in from time to time from the tank venting system, is possible.

According to another feature of the invention, the operating state of the internal combustion engine includes a rotational speed and/or a load state of the internal combustion engine.

In this context, there are thus embodiments in which the operating state of the internal combustion engine includes a rotational speed and/or a load state. The purge air system can thus be matched in an optimum way to the operating state of the internal combustion engine. It is not necessary to modify the operating state of the internal combustion engine with a view to a required regeneration of the activated carbon filter; instead, the tank venting system adapts to the desired or (consumption-)optimized operating state of the internal combustion engine.

According to a further feature of the invention, the intake air flow is fed to the internal combustion engine via a compressor, wherein the metering occurs in accordance with an operating state of the compressor.

Thus, in an embodiment of the invention, the intake air flow is fed to the internal combustion engine via a compressor and the metering is determined additionally or largely in accordance with an operating state of the compressor. This allows a pump operation that can be controlled or adjusted in accordance with the activity of a periodically operating compressor. It is thus possible to match the output of the purge air pump to the compressor output. In this way, any pressure gradients existing between the purge air line and the intake tract can be allowed for in a simple manner by means of the operation of the compressor (e.g. by means of the rotational speed or power consumption thereof).

According to another feature of the invention, the compressor is configured as an exhaust turbocharger.

In this context, there are thus embodiments in which the compressor is embodied as an exhaust turbocharger. Exhaust turbochargers are particularly suitable for allowing high powers and low-consumption fuel use in relatively small-volume spark ignition engines. Matching the tank venting system to such internal combustion engines with an exhaust turbocharger expands the possibilities of exerting a positive effect on emissions, especially HC emissions, without restricting the regeneration of the activated carbon filter in the process.

According to another feature of the invention, the purge air flow is fed to the intake air flow ahead of the compressor, in relation to an intake air flow direction.

In embodiments in which the purge air flow is fed to the intake air flow ahead of the compressor or exhaust turbocharger, relative to the intake air flow direction, purge air pumps are particularly effective since the pressure conditions are favorable for effective purging (absolute pressure level in the purge air system is low). In such an embodiment, it is possible to carry out regeneration of the activated carbon filter reliably by means of the purge air pump, even when the pressure difference between the environment and the intake pipe region ahead of the exhaust turbocharger is small. It is not necessary to adapt the operating state of the internal combustion engine.

According to yet another feature of the invention, the purge air pump includes an electric drive, the electric drive is adjustable in a current-dependent and/or a voltage-dependent manner with regard to a torque and/or a rotational speed thereof by the controller such that the metering occurs by controlling the electric drive.

There are embodiments in which the purge air pump includes an electric drive which can be adjusted by means of the controller in terms of torque and/or rotational speed as a function of the current and/or voltage. Metering is performed by control of the electric drive. The adjustment of the purge air flow in respect of its pressure, its mass and/or its volume and, respectively, the metering of the regenerated fuel can be implemented in a particularly simple manner by means of the electric supply values of the electric drive. The drive can be controlled in a simple manner by means of a current, a voltage and/or an excitation frequency, for example.

According to another feature of the invention, the controller includes a characteristic map, wherein the controller controls the electric drive via the characteristic map.

In this context, there are thus embodiments in which this control of the electric drive is performed by means of a characteristic map. In this way, it is possible, for example, to associate the operating states of the internal combustion engine and/or those of a compressor with certain control values of the electric drive. In this way, the purge air pump can be controlled in the desired manner even by means of complex operating state combinations (e.g. if several characteristic maps are combined).

According to another feature of the invention, the metering of the regenerated fuel occurs by taking into account a λ value detected by a λ probe disposed in an exhaust gas flow.

There are embodiments in which metering is performed while taking into account a λ value, which is detected by a λ probe disposed in an exhaust gas flow. The use of a λ control makes it possible to adjust the purge air flow not only with a view to regenerating the activated carbon filter but also with a view to extremely precise fuel metering.

According to another feature of the invention, the tank venting system includes a purge air line; a pressure sensor is disposed in the tank and/or in the purge air line for detecting a purge air pressure; and the controller is configured to control the purge air pump such that the purge air flow is adjusted by taking into account a pressure signal.

There are thus embodiments in which a pressure sensor for detecting a purge air pressure is disposed in a purge air line and/or the tank and the purge air flow is adjusted while taking into account a pressure signal. This makes it possible to extend the control criteria for the purge air pump to include a pressure value.

According to another feature of the invention, the tank venting system includes a purge air line; a volume flow sensor is disposed in the purge air line for detecting a purge air volume flow; and the controller is configured to control the purge air pump such that the purge air flow is adjusted by taking into account a volume flow signal.

The same applies to embodiments in which a volume flow sensor for detecting a purge air volume flow is disposed in a purge air line and the purge air flow can be adjusted while taking into account a volume flow signal. Additionally taking into account actual values in the purge air flow in this way also allows a further differentiation of the control of the purge air pump.

The same applies to solutions in which a temperature is also detected in addition. With the partial or simultaneous detection of all variables relevant to the gas flow, such as pressure, temperature and volume, it is possible to achieve control of the purge air pump with maximum differentiation.

There are also embodiments in which such sensors (pressure, volume, temperature) are alternatively or additionally provided in the tank itself, in the activated carbon filter, in a venting line or even in the intake tract and the signals thereof are used for the control of the purge air pump.

According to another feature of the invention, the tank venting system includes a valve, wherein the purge air flow is introduced into the intake air flow via the valve; the valve is controllable and/or adjustable by the controller such that, via the valve, the purge air flow is adjustable with regard to at least one parameter selected from the group including the pressure of the purge air flow, the mass of the purge air flow, and the volume of the purge air flow.

According to another feature of the invention, the valve is a shutoff and/or control valve.

There are embodiments in which the purge air flow is introduced into the intake air flow via a shutoff and/or control valve, which can be controlled and/or adjusted by means of the controller and by means of which the purge air flow can be adjusted in terms of its pressure, its mass and/or its volume. Apart from the adjustment by means of the purge air pump, it is also possible, for example, with the additional use of a shutoff and/or control valve, to achieve a regeneration of the activated carbon filter even when flow through the purge air pump is to be only passive, e.g. in the case of a sufficiently large pressure drop (pressure gradient), when the use of the pump is not necessary. Such a pressure drop can occur, for example, in the case of MPI (multipoint injection) engines without an exhaust turbocharger. An additional shutoff and/or control valve can then ensure that a regeneration of the activated carbon filter is possible, at least in certain operating states of the internal combustion engine.

According to another feature of the invention, the purge air pump is operable in a diagnostic delivery direction and a tank leaktightness diagnosis can be performed in the diagnostic delivery direction.

In embodiments in which the purge air pump can be operated in a diagnostic delivery direction, allowing a tank leaktightness or leakage diagnosis to be carried out, the range of use of the tank venting system according to the invention is extended. In some regions (e.g. North America), a tank leaktightness diagnosis device is a prescribed feature of a tank venting system. If the purge air pump can be operated in both directions, this tank leaktightness diagnosis or a leakage diagnosis can be integrated into the already existing system and may only have to be activated by the control system.

With the objects of the invention in view there is also provided, a method for regenerating a sorption reservoir, the method including:

providing a tank connected via a tank vent to the sorption reservoir for temporarily storing fuel from a tank venting flow, a purge air pump for feeding regenerated fuel from the sorption reservoir via a purge air flow into an intake air flow to an internal combustion engine, and a controller configured to control the purge air pump;

detecting an operating state of the internal combustion engine;

controlling the purge air pump and adjusting the purge air flow in accordance with an operating state of the internal combustion engine and/or a compressor;

regenerating the fuel from the sorption reservoir; and metering the regenerated fuel via the purge air flow into the intake air flow, wherein an adjustment of the purge air flow and the metering of the regenerated fuel occurs while taking into account a parameter selected from the group including a λ value, a purge air pressure, a purge air volume flow, and a purge air temperature.

In other words, a method for regenerating a sorption reservoir is provided, which has the following steps:

providing a tank venting system having at least one of the features described above;

detecting an operating state of the internal combustion engine;

controlling the purge air pump and adjusting the purge air flow in accordance with an operating state of the internal combustion engine and/or of a compressor;

regenerating the fuel from the sorption reservoir; and metering the regenerated fuel via the purge air flow into the intake air flow, wherein adjustment of the purge air flow and metering of the regenerated fuel is performed while taking into account one of the following parameters: λ value, purge air pressure, purge air volume, purge air temperature.

Such a method allows a simplified and improved control of the purge air, with the possibility of greater differentiation, for reliable regeneration of a sorption reservoir, on the one hand, and precise metering of the regenerated fuel flow into the internal combustion engine, as required for modern spark ignition engines, on the other hand.

According to another mode of the invention, the method includes a step selected from the group including detecting a pressure signal in a purge air line, detecting a volume flow signal in the purge air line, detecting a temperature signal in the purge air line, detecting a λ value in an exhaust line segment, controlling a shutoff/control valve, and controlling an electric drive of the purge air pump via at least one parameter selected from the group including a supply current, a supply voltage, and an excitation frequency.

Thus, as an option, at least one of the following steps can be provided in addition:
  detecting a pressure signal in the purge air line;
  detecting a volume flow signal in the purge air line;
  detecting a temperature signal n the purge air line;
  detecting a λ value in an exhaust line segment;
  controlling an electric drive of the purge air pump by a supply current, a supply voltage and/or an excitation frequency;
  controlling a shutoff/control valve.

Such a method extended by at least one of these measures allows control of the purge air and metering of the regenerated fuel with greater differentiation and thus possibly also with further improvement.

With the objects of the invention in view there is also provided, a motor vehicle including:
  an internal combustion engine having a tank venting system, the tank venting system including a tank, a tank vent, a sorption reservoir, a purge air pump, and a controller;
  the tank being connected via the tank vent to the sorption reservoir for temporarily storing fuel from a tank venting flow;
  the purge air pump feeding regenerated fuel from the sorption reservoir via a purge air flow into an intake air flow to the internal combustion engine; and
  the controller being configured to control the purge air pump such that the purge air flow is adjustable with regard to at least one parameter selected from the group including a pressure of the purge air flow, a mass of the purge air flow, and a volume of the purge air flow, so that a metering of the regenerated fuel via the purge air flow into the intake air flow occurs in accordance with an operating state of the internal combustion engine.

In other words, a motor vehicle having a tank venting system according to the invention is provided, which is configured to carry out the method indicated above, wherein the motor vehicle is improved in respect of its emissions-related equipment and in respect of the optimum use of all the available fuel components.

Embodiments of the invention are described by way of example and with reference to the attached drawings.

Although the invention is illustrated and described herein as embodied in a tank venting system for an internal combustion engine and a method for regenerating a sorption reservoir, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
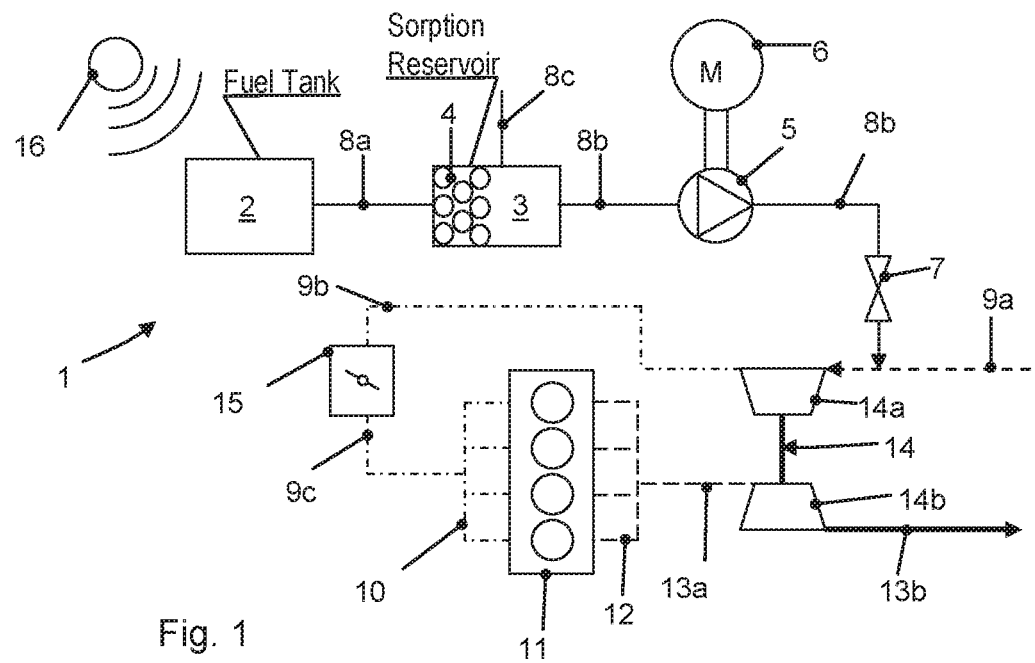
FIG. 1 is a schematic view of a first embodiment of a tank venting system according to the invention for an internal combustion engine.

Referring now to the figures of the drawings in detail and first, particularly, to FIG. 1 thereof, there is shown a first embodiment of a tank venting system 1 according to the invention. It includes a fuel tank or simply a tank 2, a sorption reservoir 3, which is embodied as an activated carbon filter or activated carbon trap (or ACF), and an activated carbon charge (activated carbon filling) 4. A purge air pump 5 having an electric drive 6 is furthermore provided, as is, optionally, a shutoff and/or control valve 7. The tank 2, the sorption reservoir 3, the purge air pump 5 and optionally the shutoff/control valve 7 are connected to one another by a tank venting line 8a and, respectively, a purge air line 8b.

The purge air line 8b opens into a first intake line segment 9a (coming from an air filter which is not shown), which opens via a second intake line segment 9b and a third intake line segment 9c and via a manifold 10 into an internal combustion engine 11 embodied as a spark ignition engine. The exhaust gases from the internal combustion engine 11 are passed via a manifold 12 into a first exhaust line segment 13a and a second exhaust line segment 13b.

The activated carbon filter 3 is disposed between the tank venting line 8a and the purge air line 8b. The purge air pump 5 is provided in the purge air line 8b between the activated carbon filter 3 and the first intake line segment 9a.

Here, the optional shutoff/control valve 7 is shown in the purge air line 8b between the purge air pump 5 and the first intake line segment 9a. In an alternative embodiment, it is also possible for this optional shutoff/control valve 7 to be provided between the activated carbon filter 3 and the purge air pump 5.

An exhaust turbocharger 14, the compressor wheel 14a of which acts between the first and the second intake line segments 9a, 9b, is disposed between the first intake line segment 9a and the second intake line segment 9b (also referred to as the pressure pipe). The turbine wheel 14b of the exhaust turbocharger 14 acts between the first and second exhaust line segments 13a and 13b.

The throttle valve 15, which regulates the intake air flow between the turbocharger 14 and the internal combustion engine 11, acts between the second intake line segment 9b and the third intake line segment 9c (also referred to as the suction pipe).

The tank venting system 1 acts as follows: if the pressure relative to the ambient pressure rises in the fuel tank 2, the excess pressure is discharged via the gas phase and the tank venting line 8a through the sorption reservoir (activated carbon filter) 3 via a discharge air line 8c. The same happens if heat is supplied by means of an energy source 16 (e.g. by solar radiation or if there is a high ambient temperature). The fuel present in the tank 2 heats up and partially evaporates. In order to prevent an impermissible increase in pressure in the tank 2, the evaporated fuel is passed through the tank venting line 8a into the sorption reservoir 3, the fuel components are accumulated in the activated carbon charge 4, and the cleaned discharge air is discharged to the environment via the discharge air line 8c.

If the fuel absorption capacity of the activated carbon filter 3 is exhausted, it must be regenerated. This is performed during the operation of the internal combustion engine 11. During this process, the electric drive 6 drives the purge air pump 5, which passes a fresh air flow via the tank venting line 8a (and possibly also through the tank 2) and via the discharge air line 8c, which then serves as a feed air line, through the activated carbon charge 4 of the activated carbon filter 3. During this process, this purge air flow absorbs the fuel accumulated in the activated carbon filter 3 and is introduced into the first intake line segment 9a (between the air filter (not shown) and the compressor wheel 14a) by means of the purge air pump 4 through the purge air line 8b. The intake air flow enriched with fuel in this way by means of the purge air flow is compressed and is passed via the second intake line segment 9b (pressure pipe) 9b, the throttle valve 15 and the third intake line segment 9c (suction pipe) via the manifold 11 into the internal combustion engine 11, wherein it is then burnt/used together with the injected primary fuel.

During this process, the purge air flow is adjusted in terms of its pressure, its mass and/or its volume by means of the purge air pump 5 and of the electric drive 6, namely in respect of an operating state of the internal combustion engine 11. It is thereby possible to adjust both the purge air quantity (volume flow) and the purge air pressure. It is furthermore also possible in this way for the regenerated fuel fed in via the purge air to be metered in in a desired manner.

For this purpose, use is made of a controller 17 (see FIG. 4), which is connected both to the internal combustion engine 11 and to the purge air pump 5 and/or to the electric drive 6. The purge air pump is controlled in accordance with the rotational speed or load of the internal combustion engine 11, for example. For this purpose, it is possible for one or more characteristic maps (e.g. containing load/rotational speed data) to be stored in the controller 17, and these are then associated with corresponding operating states of the purge air pump (pressure, volume) and/or corresponding control variables of the electric drive 6 (e.g. current, voltage, excitation frequency).

As a supplementary measure, the purge air flow can also be controlled by way of an operating state of the exhaust turbocharger 14. For this purpose, the turbocharger is coupled, via a rotational speed sensor for example, to the controller 17, which then controls the purge air pump 5 and/or the electric drive 6 while taking into account the rotational speed of the exhaust turbocharger. The different operating states of the exhaust turbocharger can also be stored in characteristic maps in the controller 17 and thus serve as a basis for a supplementary mapped control of the purge air pump 5.

During this process, the electric drive 6 is likewise controlled in respect of the torque transmitted to the purge air pump 5 and/or of a desired rotational speed by means of a supply current, a supply voltage and/or an excitation frequency. These variables correlate with a desired purge air flow, namely in respect of its pressure and of its volume (more precisely its volume flow).

To supplement and/or differentiate the control of the purge air pump 5, it is additionally possible to control the shutoff/control valve 7 (e.g. as a solenoid valve which is continuously adjustable or can be controlled in intervals). The control can be performed by means of a pulse-width-modulated control signal, for example, which determines the opening cross section or the opening/closing frequency.

Figure 2:
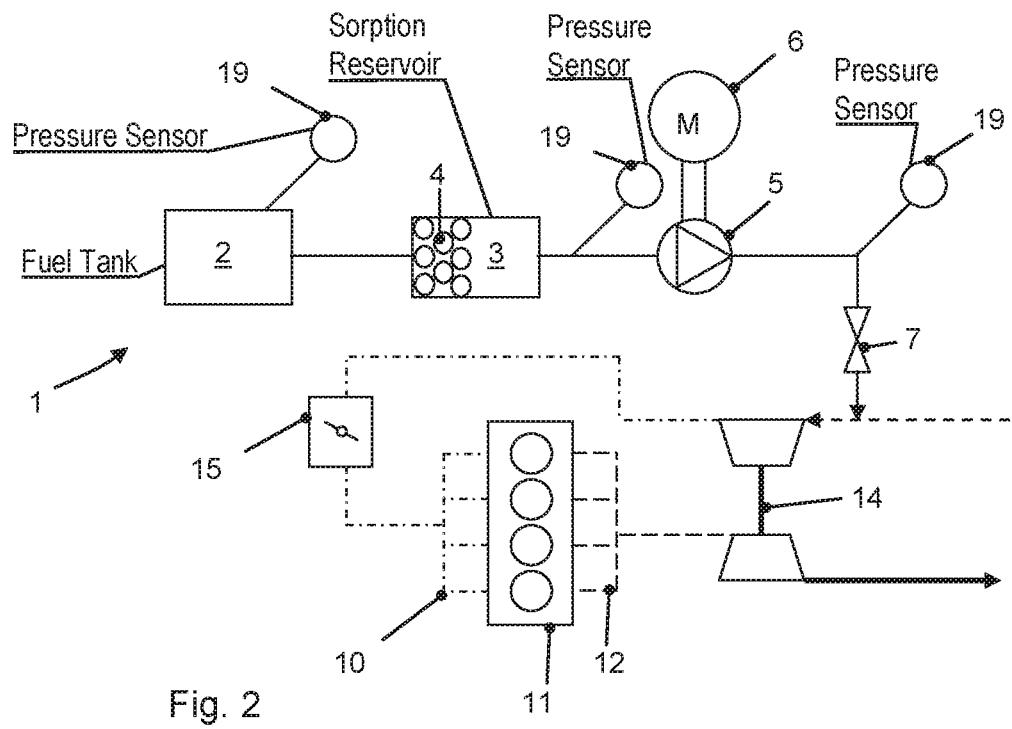
FIG. 2 is a schematic view of a second embodiment of a tank venting system according to the invention.

FIG. 2 shows a second embodiment of a tank venting system according to the invention, in which one (or more) pressure sensor(s) 19 are additionally disposed in the tank, in the tank venting line 8a and/or in the purge air line 8b, the sensor(s) emitting a corresponding pressure signal to the controller 17 and additionally adjusting the purge air flow while taking into account the pressure signal received. A pressure signal of this kind is useful, for example, for precisely adjusting or regulating a mapped control (characteristic map-oriented control) of the motor 6 and hence of the purge air pump 5 by means of an additional pressure signal upstream and/or downstream of the purge air pump.

Figure 3:
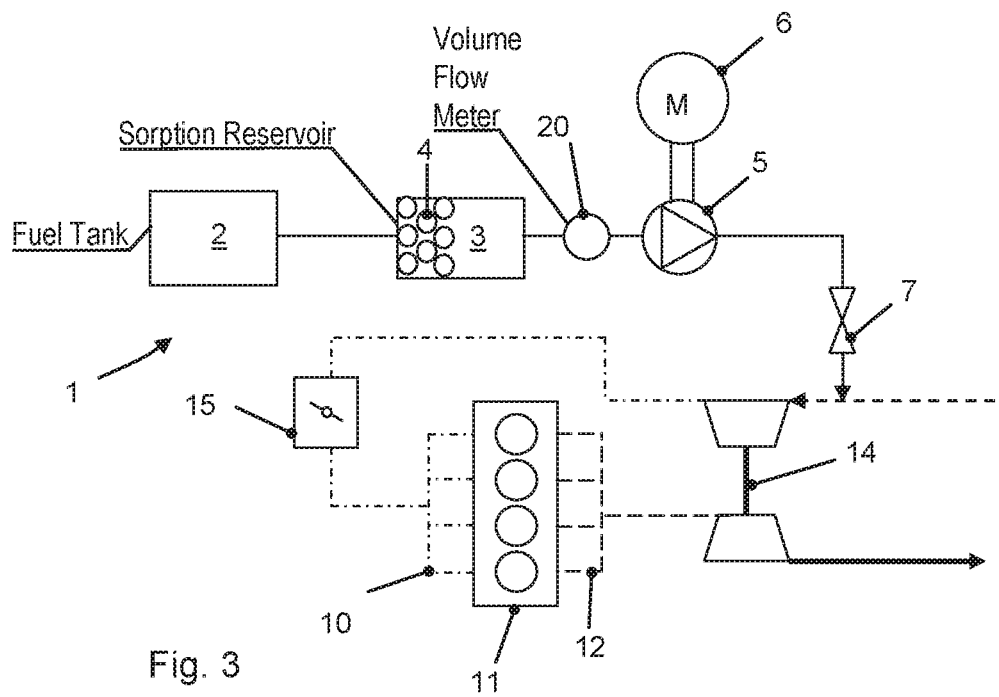
FIG. 3 is a schematic view of a third embodiment of a tank venting system according to the invention.

FIG. 3 shows a second embodiment, in which a volume flow meter 20 is additionally provided in the purge air line 8b between the activated carbon filter 3 and the purge air pump 5. This volume flow meter too emits a volume flow signal to the controller 17, causing the latter to adjust (by open-loop or closed-loop control) the purge air pump 5 and hence the purge air flow while taking into account the volume flow signal.

The embodiments shown in FIG. 2 and FIG. 3 can also be combined with one another, so that both volume flow signals and pressure signals can be used to control the purge air pump 5 and to adjust the purge air flow.

Here, both the volume flow meter 20 and the pressure sensor or sensors 19 can be supplemented by a temperature sensor 21 which is either integrated into the pressure sensor 19 or volume flow meter 20 or can be provided as a separate temperature sensor 21 in the purge air line 8b or in the purge air pump 5 and supplies corresponding signals to the controller 17.

Figure 4:
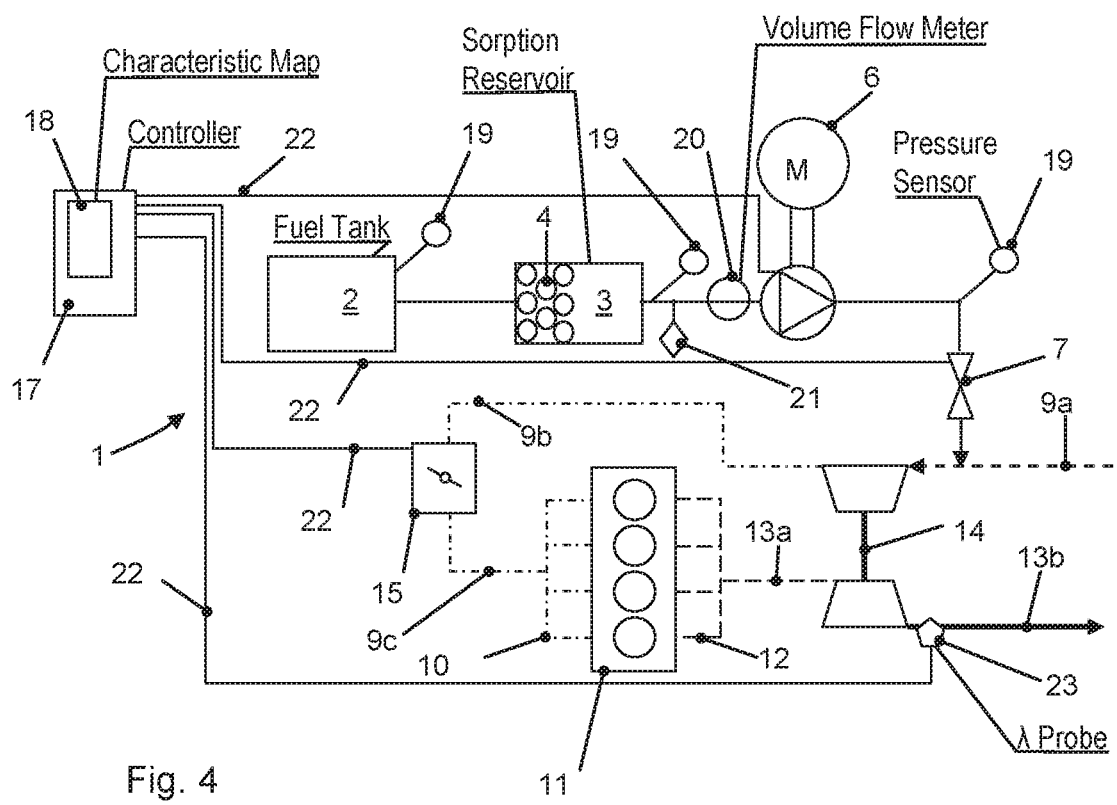
FIG. 4 is a schematic view of a fourth embodiment of a tank venting system according to the invention, in which the controller is also shown.

In FIG. 4, the controller 17 is shown with a characteristic map 18, the controller being coupled by signal and control lines 22 to the essential components of the tank venting system 1 and the internal combustion engine 11 and either receiving signals or emitting control signals via the lines.

In addition, a λ probe 23 is shown, the probe monitoring the exhaust gas composition in exhaust line segment 13b and thus monitoring the desired intake air/fuel quantity ratio (generally λ=1). By taking into account the signals from the λ probe 23, it is possible to take into account the regenerated fuel quantity during fuel injection by means of corresponding control of the purge air pump 5 and to adjust the purge air pump 5 in such a way that the regenerated fuel quantity which is metered into the intake air is constant, ensuring, for example, that the primary injection metering remains unaffected by the regenerated fuel quantity metered in during the regeneration process or is taken into account in the control of injection.

Figure 5:
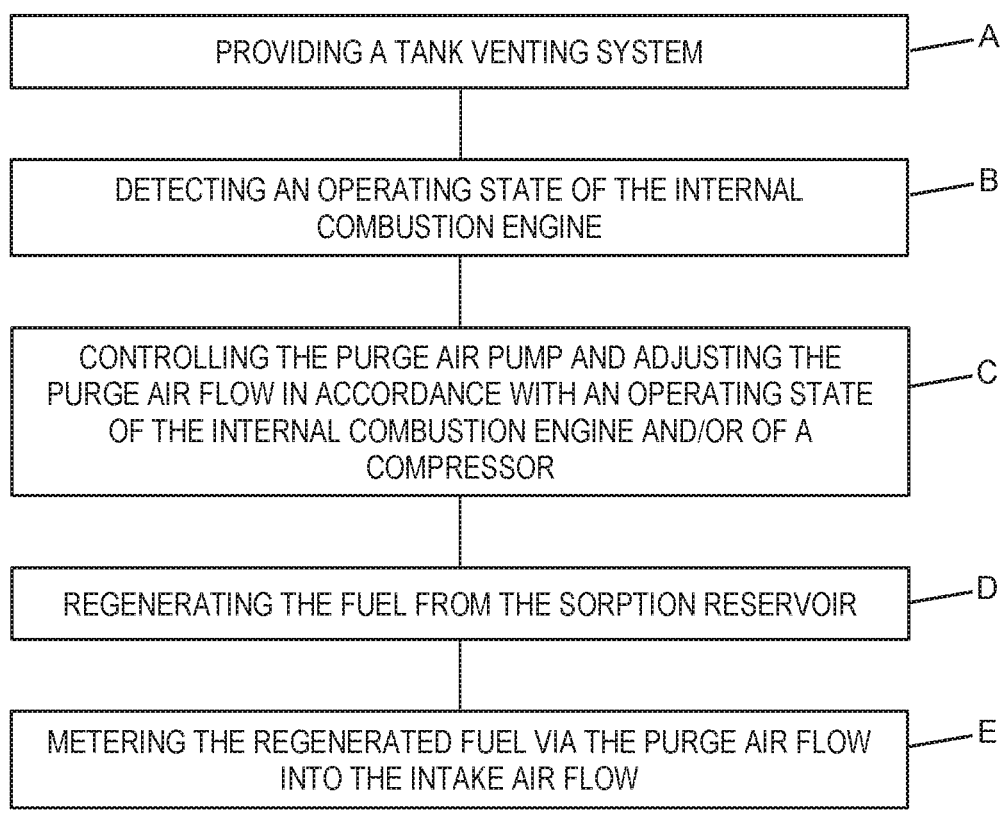
FIG. 5 is a basic flow diagram of a method according to the invention for regenerating a sorption reservoir.

The method illustrated in FIG. 5 for the regeneration of the sorption reservoir has steps A) to E), namely:

A) providing a tank venting system 1 according to the invention, which has one or more of the features described above;

B) detecting an operating state of the internal combustion engine 11;

C) controlling the purge air pump 5 and adjusting the purge air flow in accordance with an operating state of the internal combustion engine 11 and/or of a compressor 14*a*;

D) regenerating the fuel from the sorption reservoir 3; and

E) metering the regenerated fuel via the purge air flow into the intake air flow, wherein adjustment of the purge air flow and metering of the regenerated fuel is performed while taking into account one of the following parameters: λ value, purge air pressure, purge air volume flow.

As an option, at least one of the following steps can be provided in addition:

detecting a pressure signal in the purge air line 8*b*;

detecting a volume flow signal in the purge air line 8*b*;

detecting a temperature signal in the purge air line 8*b*;

detecting a λ value in an exhaust line segment 13*b*;

controlling an electric drive 6 of the purge air pump 5 by means of a supply current, a supply voltage and/or an excitation frequency;

controlling a shutoff/control valve 7.

The system and the method are also suitable for MPI spark ignition engines. The point of introduction of the purge air line 8*b* into the intake line 9*a*, 9*b*, 9*c* should then be provided ahead of a throttle valve or into the suction pipe 9*c*. In this case, the purge air pump 5 should be given a correspondingly robust configuration to ensure that it can withstand the possibly high suction pipe vacuum and the resulting high pressure differences and is suitable for adjusting the purge air flow in a desired manner.

Further embodiments and variations of the invention will become apparent to a person skilled in the art in the context of the claims.

LIST OF REFERENCE CHARACTERS

1 tank venting system
2 fuel tank, tank
3 sorption reservoir, activated carbon filter, activated carbon trap, ACF
4 activated carbon charge
5 purge air pump
6 electric drive
7 shutoff/control valve (optional)
8*a* tank venting line
8*b* purge air line
8*c* discharge air line/feed air line
9*a* first intake line segment (coming from the air filter)
9*b* second intake line segment (pressure pipe)
9*c* third intake line segment (suction pipe)
10 manifold
11 internal combustion engine, automotive engine
12 manifold
13*a* first exhaust line segment (ahead of the turbine)
13*b* second exhaust line segment (after the turbine)
14 exhaust turbocharger
14*a* compressor wheel
14*b* turbine wheel
15 throttle valve
16 heat source
17 controller
18 characteristic map
19 pressure sensor
20 volume flow meter
21 temperature sensor
22 signal and control line
23 λ probe

What is claimed is:

1. A tank venting system for an internal combustion engine, comprising:

a tank;

a tank vent;

a sorption reservoir;

said tank being connected via said tank vent to said sorption reservoir for temporarily storing fuel from a tank venting flow;

a purge air pump for feeding regenerated fuel from said sorption reservoir via a purge air flow into an intake air flow to the internal combustion engine; and a controller configured to control said purge air pump such that the purge air flow is adjustable with regard to at least one parameter selected from the group consisting of a pressure of the purge air flow, a mass of the purge air flow, and a volume of the purge air flow, so that a metering of the regenerated fuel via the purge air flow into the intake air flow occurs in accordance with an operating state of the internal combustion engine, wherein the intake air flow is fed to the internal combustion engine via a compressor, and wherein the metering additionally occurs in accordance with an operating state of said compressor such that said controller controls an output of said purge air pump in dependence on an output of said compressor.

2. The tank venting system according to claim 1, wherein the operating state of the internal combustion engine includes at least one of a rotational speed and a load state of the internal combustion engine.

3. The tank venting system according to claim 1, wherein said compressor is configured as an exhaust turbocharger.

4. The tank venting system according to claim 1, wherein the purge air flow is fed to the intake air flow ahead of said compressor, in relation to an intake air flow direction.

5. The tank venting system according to claim 1, wherein said purge air pump includes an electric drive, said electric drive is adjustable in at least one of a current-dependent manner and a voltage-dependent manner with regard to at least one of a torque and a rotational speed thereof by said controller such that the metering occurs by controlling said electric drive.

6. The tank venting system according to claim 5, wherein said controller includes a characteristic map, said controller controls said electric drive via said characteristic map.

7. The tank venting system according to claim 1, wherein the metering of the regenerated fuel occurs by taking into account a λ value detected by a λ probe disposed in an exhaust gas flow.

8. The tank venting system according to claim 1, including:

a purge air line;

a pressure sensor disposed in at least one of said tank and said purge air line for detecting a purge air pressure; and said controller being configured to control said purge air pump such that the purge air flow is adjusted by taking into account a pressure signal.

9. The tank venting system according to claim 1, including:

a purge air line;

a volume flow sensor disposed in said purge air line for detecting a purge air volume flow; and said controller being configured to control said purge air pump such that the purge air flow is adjusted by taking into account a volume flow signal.

10. The tank venting system according to claim 1, including:
a valve, wherein the purge air flow is introduced into the intake air flow via said valve;
said valve being at least one of controllable and adjustable by said controller such that, via said valve, the purge air flow is adjustable with regard to the at least one parameter selected from the group consisting of the pressure of the purge air flow, the mass of the purge air flow, and the volume of the purge air flow.

11. The tank venting system according to claim 10, wherein said valve is at least one of a shutoff valve and a control valve.

12. The tank venting system according to claim 1, wherein said purge air pump is operable in a diagnostic delivery direction and a tank leaktightness diagnosis can be performed in the diagnostic delivery direction.

13. A method for regenerating a sorption reservoir, the method comprising:
providing a tank connected via a tank vent to the sorption reservoir for temporarily storing fuel from a tank venting flow, a purge air pump for feeding regenerated fuel from the sorption reservoir via a purge air flow into an intake air flow to an internal combustion engine, and a controller configured to control the purge air pump;
detecting an operating state of the internal combustion engine;
controlling the purge air pump and adjusting the purge air flow in accordance with an operating state of at least one of the internal combustion engine and a compressor;
regenerating the fuel from the sorption reservoir; and
metering the regenerated fuel via the purge air flow into the intake air flow, wherein an adjustment of the purge air flow and the metering of the regenerated fuel occurs while taking into account a parameter selected from the group consisting of a $\lambda$ value, a purge air pressure, a purge air volume flow, and a purge air temperature, wherein the intake air flow is fed to the internal combustion engine via the compressor, and wherein the metering additionally occurs in accordance with an operating state of the compressor such that an output of the purge air pump is controlled in dependence on an output of the compressor.

14. The method according to claim 13, which comprises a step selected from the group consisting of detecting a pressure signal in a purge air line, detecting a volume flow signal in the purge air line, detecting a temperature signal in the purge air line, detecting a $\lambda$ value in an exhaust line segment, controlling a shutoff/control valve, and controlling an electric drive of the purge air pump via at least one parameter selected from the group consisting of a supply current, a supply voltage, and an excitation frequency.

15. A motor vehicle comprising:
an internal combustion engine having a compressor and a tank venting system, said tank venting system including a tank, a tank vent, a sorption reservoir, a purge air pump, and a controller;
said tank being connected via said tank vent to said sorption reservoir for temporarily storing fuel from a tank venting flow;
said purge air pump feeding regenerated fuel from said sorption reservoir via a purge air flow into an intake air flow to said internal combustion engine; and
said controller being configured to control said purge air pump such that the purge air flow is adjustable with regard to at least one parameter selected from the group consisting of a pressure of the purge air flow, a mass of the purge air flow, and a volume of the purge air flow, so that a metering of the regenerated fuel via the purge air flow into the intake air flow occurs in accordance with an operating state of said internal combustion engine, wherein the intake air flow is fed to said internal combustion engine via said compressor, and wherein the metering additionally occurs in accordance with an operating state of said compressor such that said controller controls an output of said purge air pump in dependence on an output of said compressor.

16. The motor vehicle according to claim 15, wherein the operating state of said internal combustion engine includes at least one of a rotational speed and a load state of said internal combustion engine.

17. The motor vehicle according to claim 15, wherein said compressor is configured as an exhaust turbocharger.

18. The motor vehicle according to claim 15, wherein the purge air flow is fed to the intake air flow ahead of said compressor, in relation to an intake air flow direction.

* * * * *